Figure 1:
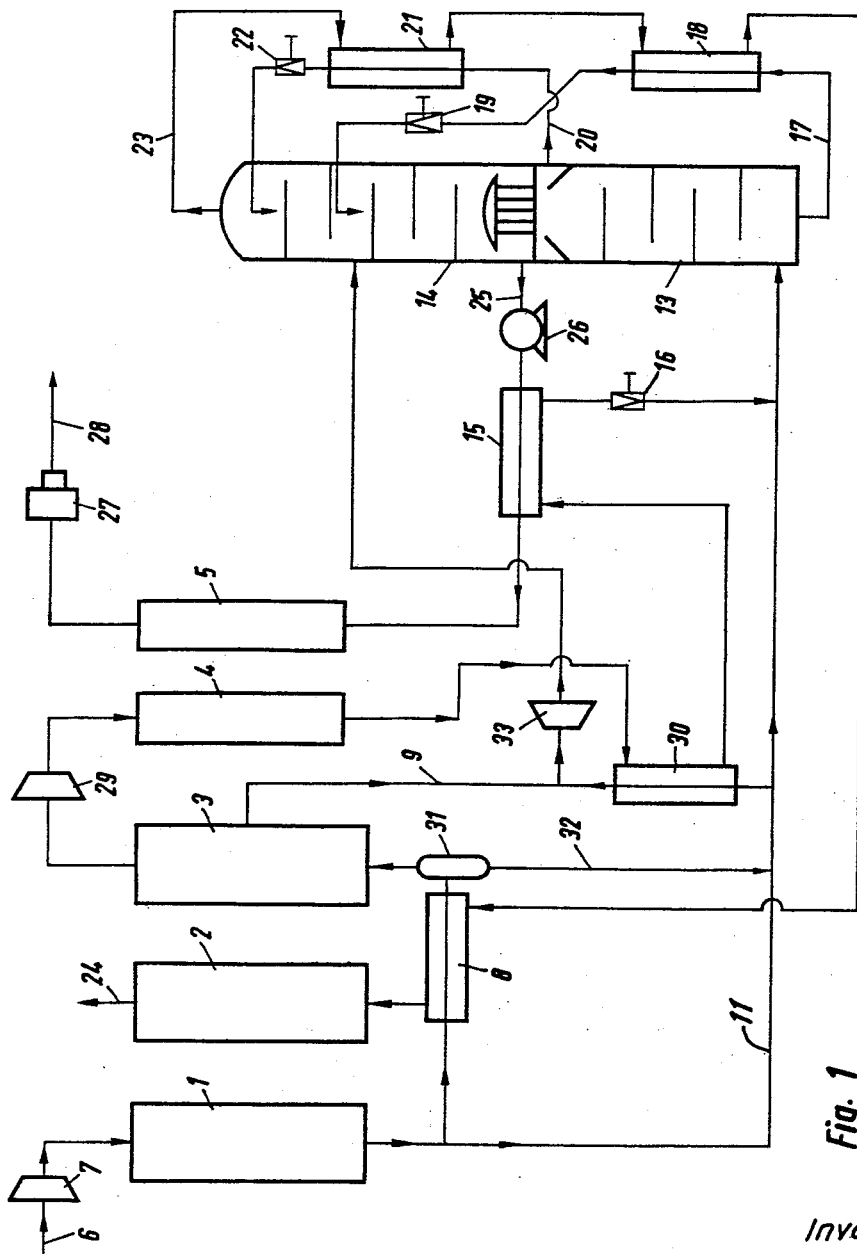

Inventor
RUDOLF BECKER
By Toulmin & Toulmin
Attorneys

Inventor
RUDOLF BECKER
By Toulmin & Toulmin
Attorneys

United States Patent Office 3,143,406
Patented Aug. 4, 1964

3,143,406
SYSTEM FOR CONDUCTING HEAT EXCHANGE OPERATIONS IN A GAS SEPARATION APPARATUS INCORPORATING PERIODICALLY REVERSIBLE REGENERATORS
Rudolf Becker, Munich-Solln, Germany, assignor to Gesellschaft fur Linde's Eismaschinen Aktiengesellschaft, Wiesbaden, Germany
Filed Aug. 10, 1961, Ser. No. 130,627
Claims priority, application Germany Aug. 13, 1960
9 Claims. (Cl. 62—13)

This invention relates to a method and apparatus for heat exchange processes in a gas separation system operating with periodically reversible regenerators.

This application is a continuation-in-part of copending application Serial No. 818,606, filed June 8, 1959, now Patent No. 3,100,696.

It is old to cool and clean a feed gas by a regenerator arrangement in a low temperature separation system; and subsequently to pass separation products through the regenerators in a reverse direction, heating them thereby to the ambient temperature and simultaneously freeing the regenerators from impurities deposited by the feed gas. When this latter step occurs, the separation products are necessarily contaminated by the absorbed deposits (German Patent 1,046,640).

It is also old to obtain particularly pure separation products by diverting a portion of the feed gas to be separated, said gas being previously cooled and cleaned in the regenerators, through an additional heat exchanger. This cooled and cleaned feed gas is heated to the ambient temperature; and the pure gaseous separation products are heated by this feed gas, wherein the feed gas is cooled to separation temperature (German Patent 1,065,867). This method, however, has the disadvantage that an additional heat exchanger is needed for the pure product. Furthermore, since the heat exchanger cannot be rinsed, trace impurities ultimately accumulate therein and plug up the tubes of the heat exchanger.

It is the object of this invention, therefore, to obviate the disadvantage of the prior art and to provide a system for conducting the heat exchange between the feed gas to be separated and the gaseous separation products in regenerators only, and to obtain pure air separation products.

Upon further study of the specification and appended claims, other objects and advantages of the present invention will become apparent.

The objects of this invention are attained by heating a portion of the cooled feed gas to the ambient temperature of a regenerator and then cooling it again in at least one other regenerator in periodic alternation with at least one separation product, which in turn is heated and obtained in particularly pure form. Preferably, air separation apparatus is used wherein the feed gas is initially cooled and cleaned in a regenerator arrangement. After the cooled and cleaned gas is subjected to a subsequent rinsing period, preferably with gas separation products, at least a part of rinsed feed gas is heated in the regenerator arrangement to the ambient temperature, and is then again passed to the gas separation section.

This method is advantageous because the majority of the regenerators through which only pure gases pass, can be smaller with the same heat transfer times, and are less than half in size than those regenerators in which impurities must be deposited. Thereby, it is possible to cause, even at flow reversal, less contamination of the pure product with feed gas than in normal regenerator operation. This effect can still be improved if greater temperature differences and greater pressure drops are acceptable for the heat exchange between the pure gaseous separation product and the feed gas mixture. Particularly suitable are regenerators which have a storage mass with a large quantity of packing. Such regenerators can, for example, be made by using closely wound conductors or flat pieces as packing.

The compressed feed gas is first cooled and cleaned in a regenerator (reversible heat exchange zone) and a portion of the treated feed is diverted to the ratification zone. The other position of the cleaned feed gas is passed through a second regenerator (which was cleaned in the previous cycle by a gaseous separation product in the process of giving up its refrigerant value), wherein said portion is heated at least partly to the ambient temperature. A part of this portion of the cleaned feed gas can be taken off at an intermediate position if desired and expanded efficiently into work. The remainder of the gas stream heated to the ambient temperature and cleaned is subsequently led through a third regenerator and cooled, in which regenerator the pure separation product is heated in periodic intervals. If two pure separation products are needed, two additional regenerators must be used through which pass alternately a portion of the purified gas heated to the ambient temperature and a part of the other separation product which is to be obtained in pure form. To overcome the pressure drop which the branched-off gas sustains upon reheating and cooling in the corresponding regenerators, it is advisable to recompress the reheated gas with a blower, before it is cooled again in the regenerators for the pure product.

Figure 2:
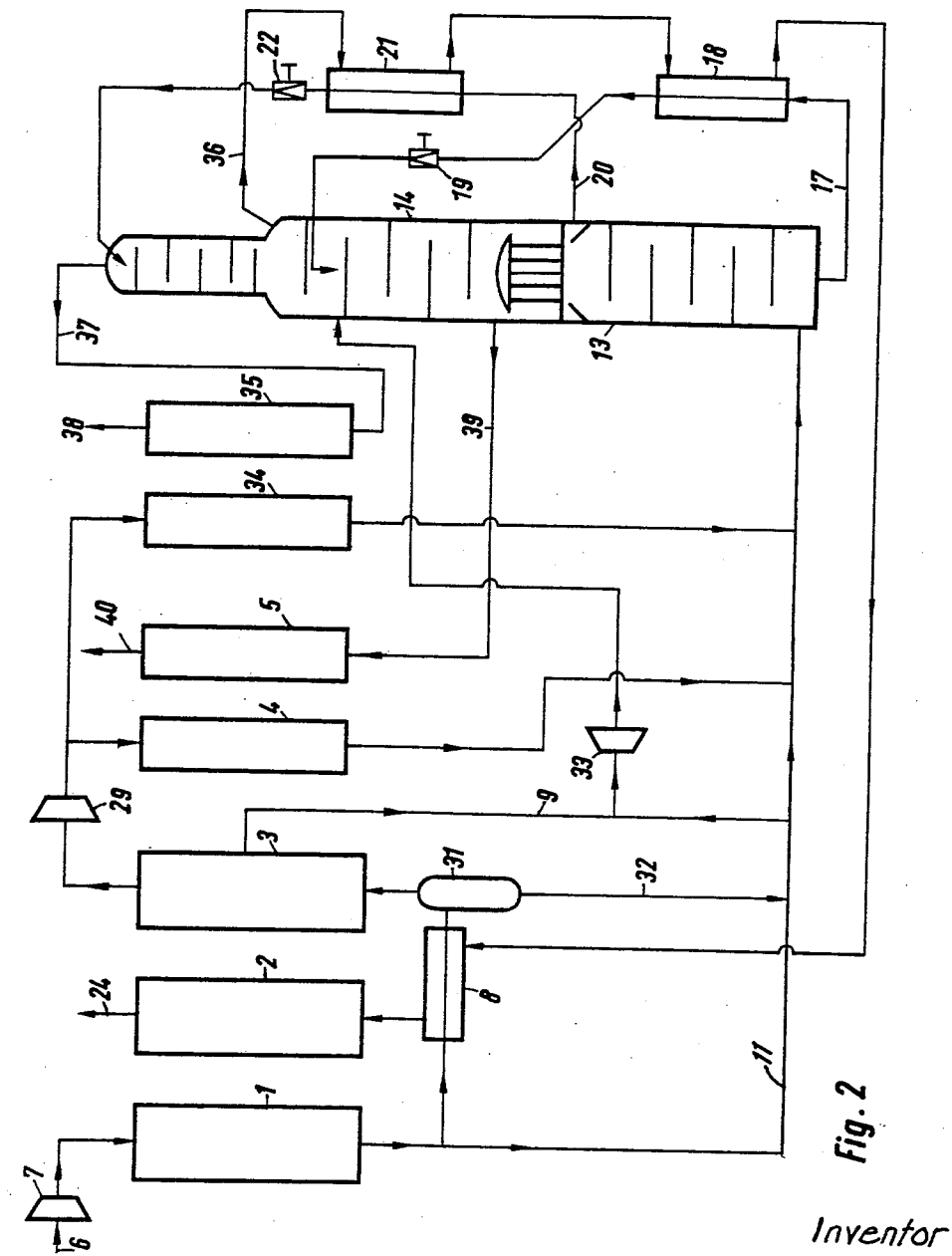

In the attached drawings, FIGURE 1 is a schematic flowsheet of an embodiment of this invention, wherein only one separated gas is recovered, and FIGURE 2 is similarly an embodiment wherein two components are recovered. For purposes of clarity, the reversal lines and valves are not shown on the drawings, but it is to be understood that the regenerator groups are cyclically interchanged with one another in accordance with conventional practice.

Referring to the drawings in greater detail, it is seen that FIGURE 1 shows an arrangement in which the method of the invention is used in connection with another method (patent pending) for producing pure high pressure oxygen. Air is led to the apparatus through conduit 6, is compressed in compressor 7 to about 5.7 atm., is led through regenerator 1 and is cooled and cleaned therein. A portion of the air is led through conduit 11 directly into pressurized column 13 of a two-stage rectification apparatus. The other part is cooled further in heat exchanger 8, and is thereby partly liquefied and separated in separator 31 into a liquid and a gaseous portion. The liquid portion is led through conduits 32 and 11 to column 13. The gaseous portion is led into regenerator 3, and is heated therein. A portion of the heated gas is taken off at an intermediate point through conduit 9, is expanded in turbine 33 together with the air heated in heat exchanger 30, and is led into low pressure column 14.

The other portion of the gas led into regenerator 3 is heated according to the invention up to the ambient temperature, is then compressed in compressor 29 to about 10 atm., and subsequently cooled in regenerator 4 to close to the liquefying temperature, e.g., about $-165°$ C. Next, this portion is further cooled in heat exchanger 30, thereby being partly liquefied and then led into heat exchanger 15. There, more air is liquefied in heat exchange with evaporating oxygen of about 3.8 atm., and finally expanded through valve 16 into the pressure column 13. Pure liquid oxygen is taken from the low pressure column through conduit 25, brought to a pressure of 3.8 atm. by pump 26, and evaporated in the regenerator 5 to ambient temperature. After another compression in compressor 27 the pure oxygen under pressure leaves the apparatus through conduit 28. The separation of the air in the two-stage recification column is accomplished by a conventional manner, e.g., see reference German Patents Nos. 1,046,640 and 1,065,867. Through conduit 17 an oxygen-rich mixture is taken from the bottom of the pressure column, is cooled in heat exchanger 18 and is expanded by means of valve 19 at an intermediate position in the low pressure column. Through the conduit 20 liquid nitrogen is taken from pressure column 13; it is then cooled in heat exchanger 21 and by means of valve 22 is recycled as reflux liquid at the head of column 14. Gaseous nitrogen leaves the head of this column through conduit 23. It is heated in heat exchangers 21, 18 and 8 and subsequently in regenerator 2 and removed from the apparatus by way of conduit 24.

In FIGURE 2 an apparatus is shown in which two pure separation products can be produced, i.e., pure nitrogen and pure oxygen. The additional regenerators 34 and 35 serve to produce pure nitrogen which is taken from low pressure column 14 through the conduit 37 and led away through conduit 38 after heating in regenerator 35. Impure nitrogen is removed from column 14 by way of conduit 36, heated in the manner known from FIGURE 1 and exits the apparatus through conduit 24. The pure oxygen is taken from column 14 as a gas through conduit 39 and after heating led away in heat exchanger 5 without pressure through conduit 40. The compressor 29 in this apparatus only serves to compensate for the pressure drop caused by the repeated passage of air through the regenerators. Othewise this system corresponds to that of FIGURE 1.

If pure nitrogen only is to be obtained, the oxygen regenerators 4 and 5 can be provided in a known manner with impure air or can be dispensed with completely.

With respect to the portion of feed gas that is heated in one regenerator and cooled in another according to this invention, it is apparent that even a small portion will be beneficial. In general, however, the feed gas emerging from the first regenerator 1 is divided so that from 11 to 70%, preferably from 15 to 60% is diverted to line 11, and from 89 to 30%, preferably from 85 to 40% is passed through heat exchanger 8 into liquid-gas separator 31. Of the feed in separator 31, about from 0.5 to 15%, preferably from 1 to 10% is diverted to line 32 and from 99.5 to 85%, preferably from 99 to 90% is passed to regenerator 3. Of the feed in regenerator 3, about from 6 to 50%, preferably from 6 to 30% is diverted to line 9, and from 94 to 50%, preferably from 94 to 75% is passed into compressor 29 for cooling in regenerator 4.

For purposes of further illustration, the following numerical examples are presented, but it is to be appreciated that these examples are in no way limitative of the invention as set forth in the specification and appended claims.

*Example 1*

Via line 6, 50,000 Nm.³/h. (normal cubic meters per hour) of air are fed to the plant represented in FIGURE 1. Said quantity of air is compressed to 5.7 atm. in compressor 7 and then fed to the regenerator 1. Of said quantity, about 1,500 Nm.³/h. are lost in the regenerators during the switchover process. 48,500 Nm.³/h. of air leave the cold end of the regenerator. 15,000 Nm.³/h. stream to heat exchanger 8, 33,500 Nm.³/h. to the pressure column 13 via line 11. In heat exchanger 8, about 1,000 Nm.³/h. are liquefied and stream to the pressure column 13 via line 32. 14,000 Nm.³/h. are fed to the regenerator 3 from where a quantity of 4,000 Nm.³/h. is withdrawn via line 9. 10,000 Nm.³/h. leaving the warm end of the regenerator 3, are compressed in the compressor 29 to about 10 atm. and then passed through the regenerator 4 where said quantity is cooled to about 108° K. and then fed into the pressure column 13.

In the two stage rectifying column 13, 14, the air is separated into a fraction of 10,000 Nm.³/h. of pure oxygen which leaves through line 25 and a fraction of 38,500 Nm.³/h. of impure nitrogen which leaves through line 23. The pure liquid oxygen withdrawn from the rectifying column 14 through line 25 is compressed in pump 26 to 3 atm., evaported in the liquefier 15 in heat exchange with liquefying air, heated in the regenerator 5 to ambient temperature and fed into the consumption line by means of the compressor 27. The impure nitrogen withdrawn from the rectifying column 14 through line 23 leaves the plant via the heat exchangers 21, 18, 8 and the regenerator 3.

*Example 2*

Via line 6, 50,000 Nm.³/h. (normal cubic meters hour) of air are fed to the plant represented in FIGURE 2. Said quantity of air is compressed to 5.7 atm. in compressor 7 and then fed to the regenerator 1. Of said quantity, about 1,500 Nm.³/h. are lost in this regenerator during the switchover process. 48,500 Nm.³/h. of air leave the cold end of this regenerator. 28,500 Nm.³/h. of said air stream to heat exchanger 8, 20,000 Nm.³/h. to the pressure column 13 via line 11. In heat exchanger 8, about 500 Nm.³/h. of said air are liquefied and stream to the pressure column 13 via line 32. 28,000 Nm.³/h. are fed to the regenerator 3 from where a quantity of 3,000 Nm.³/h. is withdrawn via line 9. 25,000 Nm.³/h. leaving the warm end of the regenerator 3, are compressed in the compressor 29 to about 10 atm. and divided in a part of 10,000 Nm.³/h. which is passed through the regenerator 4, and a part of 15,000 Nm.³/h. which is passed through regenerator 34, whereby both streams are cooled to about 108° K. and then fed into the pressure column 13.

In the two stage rectifying column 13, 14, the air is separated into a fraction of 15,000 Nm.³/h. of pure nitrogen, which leaves through line 37, a fraction of 10,000 Nm.³/h. of pure oxygen, which leaves through line 25 and a fraction of 38,500 Nm.³/h. of impure nitrogen, which leaves through line 36. This three fractions are warmed in the regenerators 24, 5 and 35 respectively to ambient temperature and are then withdrawn from the plant.

By virtue of the present invention, it is possible to produce pure gases such as oxygen having impurities in the range of 5 parts per million (in the following abbreviated "p.p.m.") carbon dioxide and 10 p.p.m. water. This is to be contrasted to conventional methods as described in German Patent 1,046,640 which yields impurities of about 300 p.p.m. carbon dioxide and 5,000 p.p.m. water. Furthermore, the present invention is not encumbered by an extra heat exchanger which is ultimately fouled on continuous operation as is the case in the system incorporated in German Patent 1,065,867. Still further, as compared to the conventional prior art processes, the inventive method of this invention requires less investment capital as many of the regenerators can be made smaller for the same output. Consequently, it is apparent that this invention offers purer products, smoother operation and less investment capital than prior art processes; and in view of the particular nature of the gas separation industry where even minor improvements are economically important, it is seen that the present invention contributes significantly to the advance of the art.

For the foregoing description, it is apparent that one skilled in the art can appreciate the essential characteristics of this invention, and without departing from the spirit and scope thereof, can modify and adapt this invention to various usages and conditions. Thus, such adaptations and modifications should, and are intended to be within the range of equivalents of the following claims.

What I claim is:

1. In a process for the separation of a gas mixture into a higher boiling point fraction and at least one fraction of lower boiling point, the method which comprises compressing the gas mixture, cooling and purifying the compressed gas mixture in at elast one regenerator of a reversing regenerator system, feeding a first part of the cooled compressed gas mixture into a rectifying device, passing a second part of the cooled compressed gas mixture in the opposite direction through a second regenerator previously at least partially freed from formerly deposited impurities of the crude gas mixture by passing at least part of a separation product gas through it, warming the cooled and cleaned gas mixture thereby at least partially to ambient temperature, cooling said warmed second part of the gas mixture by passing it through a third regenerator through which at least part of a separation product withdrawn from the rectifying device was previously passed, warming said separation product thereby to ambient temperature, passing said second part of the gas miture into the rectifying device, withdrawing other separation products from the rectifying device and warming them in further reversing regenerators.

2. The process of claim 1, wherein the second portion is heated to the ambient temperature in the second regenerator and is then cooled to about the liquefying temperature in the third regenerator.

3. The process of claim 1, wherein the warmed second portion from the second regenerator is compressed prior to being passed into the third regenerator.

4. The process of claim 2, wherein said second portion in said second regenerator is divided so that a part of said second portion is withdrawn prior to reaching the ambient temperature of said second regenerator, and is epanded and converted efficiently into external work.

5. A rectification system comprising a first regenerator for cleaning and cooling a feed, a conduit from said first regenerator to a rectification column, a second conduit from said first regenerator to a second regenerator, a third conduit from said second regenerator to a third regenerator, a fourth conduit from said third regenerator to said rectification column, said first and fourth conduits being feed lines, and a fifth and sixth conduit from said rectification column to a fourth and fifth regenerators respectively, and said third and fourth regenerators being reversible and interchangeable as well as said first, second and fifth regenerators.

6. The apparatus of claim 5, wherein said third and fourth regenerators are about one half the size of said first, second and fifth regenerators.

7. The apparatus of claim 5 wherein said regenerators are filled with a large quantity of packing.

8. The apparatus of claim 7 wherein the packing is comprised of closely wound conductors.

9. The apparatus of claim 7 wherein said packing is comprised of flat pieces.

References Cited in the file of this patent

UNITED STATES PATENTS

| | | |
|---|---|---|
| 2,504,051 | Schiebel | Apr. 11, 1950 |
| 2,534,478 | Roberts | Dec. 19, 1950 |
| 2,659,216 | Sargent | Nov. 17, 1953 |
| 2,737,784 | Becker | Mar. 13, 1956 |
| 2,817,215 | Sixsmith | Dec. 24, 1957 |
| 2,822,675 | Grenier | Feb. 11, 1958 |
| 2,850,880 | Jakob | Sept. 9, 1958 |
| 2,915,882 | Schuftan | Dec. 8, 1959 |
| 2,955,434 | Cost | Oct. 11, 1960 |

FOREIGN PATENTS

| | | |
|---|---|---|
| 1,065,867 | Germany | Sept. 24, 1959 |